(12) United States Patent
Sprenkel et al.

(10) Patent No.: US 10,870,801 B2
(45) Date of Patent: Dec. 22, 2020

(54) TOPSIDE OIL PRODUCTION EQUIPMENT SYSTEM FOR REDUCTION IN SPACE AND WEIGHT

(71) Applicant: Cameron Solutions, Inc., Houston, TX (US)

(72) Inventors: Marcus D. Sprenkel, Houston, TX (US); Gary W. Sams, Spring, TX (US); S. Pavankumar B. Mandewalkar, Houston, TX (US); Luis Eduardo Caires Fernandez, Cypress, TX (US)

(73) Assignee: CAMERON SOLUTIONS, INC., Houston, TX (US)

( * ) Notice: Subject to any disclaimer, the term of this patent is extended or adjusted under 35 U.S.C. 154(b) by 60 days.

(21) Appl. No.: 15/937,187

(22) Filed: Mar. 27, 2018

(65) Prior Publication Data

US 2018/0208859 A1 Jul. 26, 2018

Related U.S. Application Data

(63) Continuation of application No. 14/977,931, filed on Dec. 22, 2015, now Pat. No. 9,957,446.

(51) Int. Cl.
*C10G 32/02* (2006.01)
*C10G 53/02* (2006.01)
(Continued)

(52) U.S. Cl.
CPC ........... *C10G 32/02* (2013.01); *B01D 1/0094* (2013.01); *B01D 1/305* (2013.01); *B01D 17/02* (2013.01);
(Continued)

(58) Field of Classification Search
CPC .......... B01D 17/06; C02F 1/463; C10G 33/02
See application file for complete search history.

(56) References Cited

U.S. PATENT DOCUMENTS

| 5,507,958 A | 4/1996 | White-Stevens | |
| 6,709,500 B1 * | 3/2004 | West | B01D 17/0211 210/512.2 |

(Continued)

FOREIGN PATENT DOCUMENTS

| GB | 2258167 A | 2/1993 |
| WO | 03033872 A1 | 4/2003 |

OTHER PUBLICATIONS

"International Search Report and Written Opinion of the International Searching Authority", dated Mar. 29, 2017.
(Continued)

*Primary Examiner* — Brian W Cohen
(74) *Attorney, Agent, or Firm* — Hauptman Ham, LLP; Ronald G. Embry, Jr.

(57) ABSTRACT

A system and method for dehydrating crude oil on a floating production storage and offloading installation include a separator vessel to receive an incoming produced water stream, followed by a flash vessel, a treatment block, a crude oil storage tank, and an electrostatic treater. The treatment block includes a low pressure degasser followed by a compact electrostatic separator pre-treater or a compact electrostatic separator pre-treater followed by a low pressure degasser. The flash vessel and/or the low pressure degasser may employ an inlet cyclonic distributor and demisting cyclones, while the electrostatic treater may employ DUAL FREQUENCY® technology. The separator vessel may be a single horizontal two-phase separator/degasser or two vertical two-phase separator/degassers that operate in parallel with each receiving approximately 50 percent of the incoming produced water stream. The final outlet stream preferably contains no more than 0.5 BS&W and 285 milligrams per liter salt.

17 Claims, 7 Drawing Sheets

(51) Int. Cl.
  *B01D 1/00* (2006.01)
  *B01D 1/30* (2006.01)
  *B01D 17/02* (2006.01)
  *B01D 19/00* (2006.01)
  *B01D 21/26* (2006.01)
  *B03C 11/00* (2006.01)
  *C10G 7/00* (2006.01)
  *C10G 31/10* (2006.01)
  *C10G 33/02* (2006.01)
  *C10G 33/06* (2006.01)

(52) U.S. Cl.
  CPC ..... *B01D 17/0217* (2013.01); *B01D 19/0036* (2013.01); *B01D 21/267* (2013.01); *B03C 11/00* (2013.01); *C10G 7/00* (2013.01); *C10G 31/10* (2013.01); *C10G 33/02* (2013.01); *C10G 33/06* (2013.01); *C10G 53/02* (2013.01); *B03C 2201/02* (2013.01); *C10G 2300/208* (2013.01)

(56) References Cited

U.S. PATENT DOCUMENTS

| | | |
|---|---|---|
| 6,860,979 B2 | 3/2005 | Sams |
| 7,351,320 B2 | 4/2008 | Sams |
| 9,095,790 B2 | 8/2015 | Sams |
| 2009/0159426 A1 | 6/2009 | Chen |
| 2011/0023595 A1 | 2/2011 | Allouche |
| 2011/0139625 A1 | 6/2011 | Arntzen et al. |
| 2012/0160103 A1 | 6/2012 | Suppiah et al. |
| 2013/0327646 A1 | 12/2013 | Sams et al. |
| 2014/0209176 A1 | 7/2014 | Lee |
| 2015/0344789 A1* | 12/2015 | Rodwell .................. C10G 7/04 208/187 |
| 2017/0173499 A1 | 6/2017 | Sprenkel et al. |
| 2017/0175008 A1 | 6/2017 | Sprenkel et al. |

OTHER PUBLICATIONS

International Preliminary Report on Patentability issued in PCT Application PCT/US2016/066980, dated Jun. 26, 2018 (10 pages).
Office Action issued in EP Application 16829354.9 dated May 23, 2019 (5 pages).
Written Opinion issued in SG application 11201805275S dated Sep. 13, 2019 (6 pages).
Office Action issued in the CN Application 2016800753499, dated Mar. 5, 2020 (12 pages).
Office Action issued in the BR Application BR112018012608-0, dated Mar. 23, 2020 (8 pages).
Office Action issued in the EP Application 16829354.9 dated Apr. 6, 2020 (6 pages).
Examination Report issued in the IN application 201817025007, dated Sep. 21, 2020 (4 pages).

* cited by examiner

TOPSIDE OIL PRODUCTION EQUIPMENT SYSTEM FOR REDUCTION IN SPACE AND WEIGHT

CROSS REFERENCE TO PENDING APPLICATIONS

The present application is a continuation of pending U.S. patent application Ser. No. 14/977,931, filed Dec. 22, 2015, which is incorporated herein by reference.

BACKGROUND OF THE INVENTION

This invention relates to systems, apparatuses, and methods used to dehydrate crude oil for storage in crude oil storage tanks of floating production storage and offloading ("FPSO") installations. More specifically, the invention relates to a process train that includes a compact electrostatic separator.

Conventional topside oil separation trains on FPSO installations employ multiple three-phase separators, which separate oil, water, and gas. These three-phase separators are typically large, heavy, and require a significant residence volume to achieve the required separation. In addition, the three-phase separators require significant space because they must be positioned horizontally within the process train.

FPSO installations have limitations on the amount of space that is available and the amount of weight that they are able to support. As a result, there is a need for systems to reduce the space and weight of the equipment required for process trains without compromising the effectiveness and efficiency of the treatment process.

SUMMARY OF THE INVENTION

A system for dehydrating crude oil on a FPSO installation includes a separator vessel to receive an incoming produced water stream, followed by a flash vessel, a treatment block, a crude oil storage tank, and an electrostatic treater. The treatment block includes a low pressure degasser followed by a compact electrostatic separator pre-treater or a compact electrostatic separator pre-treater followed by a low pressure degasser. The flash vessel and/or the low pressure degasser may employ an inlet cyclonic distributor and demisting cyclones, while the electrostatic treater may employ DUAL FREQUENCY® technology. The separator vessel may be a single two-phase separator/degasser or two two-phase separator/degassers that operate in parallel with each receiving approximately 50 percent of the incoming produced water stream.

A method for dehydrating crude oil on a FPSO installation includes routing an incoming produced water stream to a separator vessel, routing the outlet stream from the separator vessel to a flash vessel, routing the outlet stream from the flash vessel to a treatment block, routing the outlet stream from the treatment block to a crude oil storage tank, and routing the outlet stream from the crude oil storage tank to an electrostatic treater. Within the treatment block, the outlet stream from the flash vessel is routed to a low pressure degasser and a compact electrostatic separator pre-treater or to a compact electrostatic separator pre-treater and a low pressure degasser. The separator vessel may be a single two-phase separator/degasser or two two-phase separator/degassers that operate in parallel. The final outlet stream preferably contains no more than 0.5 BS&W and 285 milligrams per liter salt.

Objectives of this invention include providing systems and methods that reduce the size and weight requirements of prior art FPSO process trains without compromising treatment performance.

DETAILED DESCRIPTION OF THE PREFERRED EMBODIMENTS

Employing a compact electrostatic separator in the process train allows all of the early stages of separation to be two-phase rather than three-phase. This minimizes the different types of equipment that are required, makes the individual components of the process train smaller, and allows the process vessels to be positioned vertically within the process train, thereby reducing its overall footprint and weight.

Figure 1:
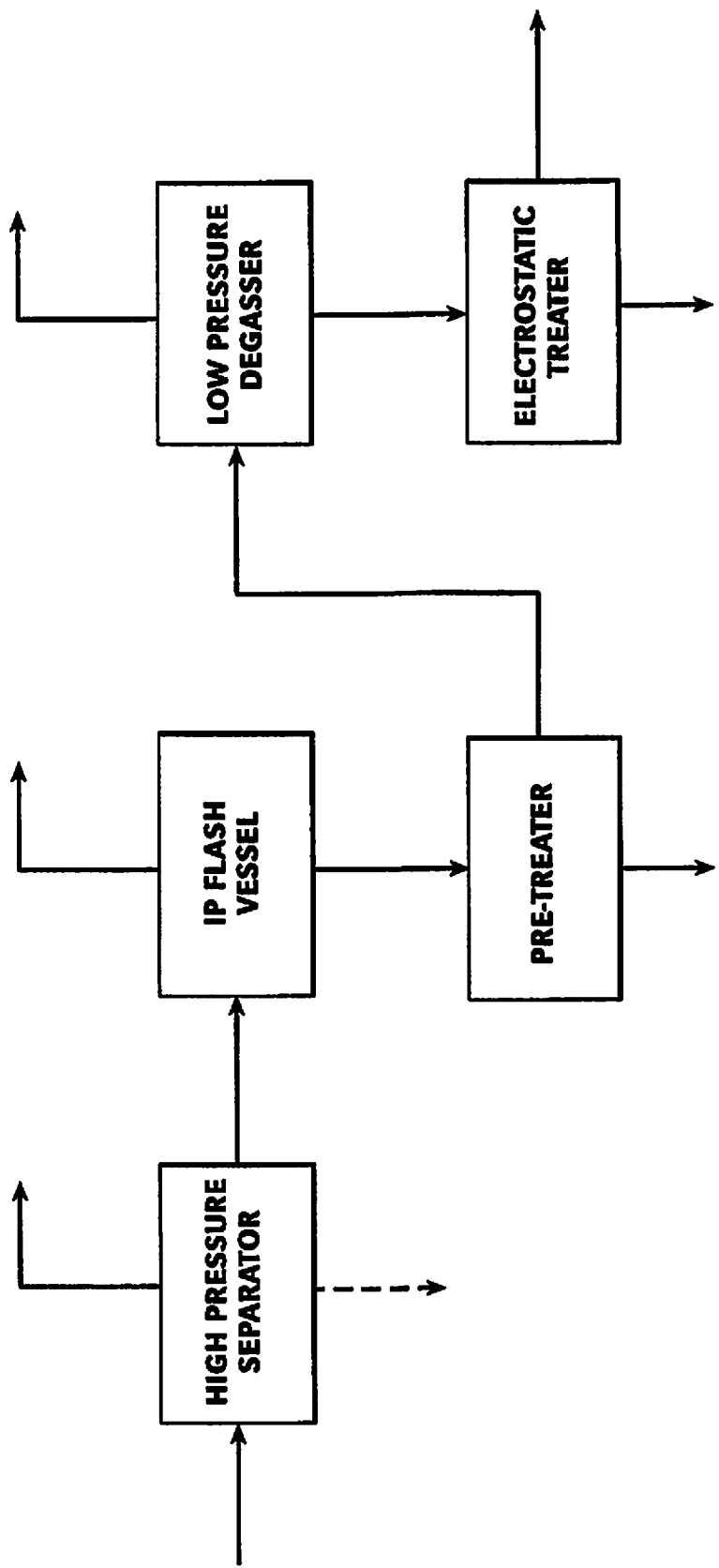
FIG. 1 is a block flow diagram of a prior art topside process train.

For the purpose of comparison to the preferred embodiments, the prior art topside process train of FIG. 1 is used. This prior art train includes a high pressure separator, an intermediate pressure flash vessel (mounted on the pre-treater), a pre-treater, a low pressure degasser (mounted on the electrostatic treater), and an electrostatic treater (see Table 1). The train also includes a crude oil storage tank located downstream of the electrostatic treater.

TABLE 1

Prior art process train.

| HP Separator | |
|---|---|
| Operating Pressure: | 2,000 kPa (a) |
| Operating Temperature: | 40° C. |
| Slug volume: | 20 m$^3$ |
| Maximum Water Content in Crude Outlet: | 25% vol |
| Size: | 4.4 m ID × 16.0 m T/T Horizontal |
| IP Flash Vessel (mounted on Pre-treater) | |
| Operating Pressure: | 770 kPa(a) |
| Operating Temperature: | 90° C. |
| Liquid Hold Up: | 2 Minutes |
| Size: | 3.3 m ID × 10.0 m T/T Horizontal mounted on Pre-treater |
| Pre-Treater | |
| Operating Pressure: | 770 kPa(a) |
| Operating Temperature: | 90° C. |
| Maximum Water Content in Crude Outlet: | 1% vol |
| Size: | 3.3 m ID × 10.0 m T/T Horizontal |
| LP Degasser (mounted on Electrostatic Treater) | |
| Operating Pressure: | 250 kPa(a) |
| Operating Temperature: | 75-80° C. |

TABLE 1-continued

Prior art process train.

| Liquid Hold Up: | 2 Minutes |
|---|---|
| Size: | 3.3 m ID × 10.0 m T/T Horizontal mounted on Pre-treater |
| Electrostatic Treater | |
| Operating Pressure: | 250 kPa(a) |
| Operating Temperature: | 75-80° C. |
| Maximum Water Content in Crude Outlet: | 0.5% vol |
| Maximum Salt content in Crude Outlet: | 285 mg/l |

The train is designed to achieve a maximum total liquids flow rate of 24,000 m$^3$/day (150,000 bpd), a maximum oil flow rate of 24,000 m$^3$/day (150,000 bpd), a maximum produced water flow rate of 19,100 m$^3$/day (120,000 bpd), and maximum gas flow rate of 6,000,000 m$^3$/day. The incoming crude oil properties are 27 API; viscosity 47.1, 30.3 and 19.9 cSt at 30°, 40°, and 50° C. respectively; initial paraffin deposit temperature of 40° C. first event and 20° C. second event; pour point of 12° C.; and severe foaming. The oil temperature on arrival to the train is in a range of 20° C. (maximum oil cases) to 40° C. (maximum water cases).

The size and weight requirements of the prior art train are shown in Table 2. The train, not including the crude oil storage tank, requires a plot area of 275 m$^2$, with a dry weight of 353.4 tonnes and an operating weight of 1047.4 tonnes. Note the amount of water-in-oil decreases at each successive processing step, with 25% water content in the outlet stream of the high pressure separator to a 1% water content in the inlet stream to the low pressure degasser.

TABLE 2

Size and weight requirements of prior art process train.

| Equipment Item | Technology & Performance | Residence Requirements | Size (ID × T/T) | Plot Area (m$^2$) | Weights (Tonnes) |
|---|---|---|---|---|---|
| HP Separator | Existing 2/3-Phase Separator Inlet: 20-80% Water, 80-20% Oil Outlet: 25% Water-in-Oil | 2 Phase: 2 Mins Liquids @ 1255 m$^3$/hr = 41.83 m$^3$ 3 Phase: 5 minutes Oil @ 1061 m$^3$/hr = 88.4 m$^3$ 5 minutes Water @ 794 m$^3$/hr = 66.2 m$^3$ 20 m$^3$ Surge both 2 & 3 phase | 4.4 m × 16 m Horizontal | 95 | 117.5 Dry 302.5 Op. |
| IP Flash Vessel | Existing Design Inlet: 20.8-28% Water-in-Oil | 2 minutes @ 1346 m$^3$/hr = 44.8 m$^3$ | 3.3 m × 10 m Horizontal | Inc. Below | 39.4 Dry 92.4 Op. |
| Pre-Treater | Existing Electrostatic Technology Outlet: 1% Water-in-Oil | As Required for Spec | 4.2 m × 16 m Horizontal | 90 | 83.8 Dry 286.8 Op. |
| LP Degasser | Existing Design Inlet: 1% Water-in-Oil | 2 minutes @ 1159 m$^3$/hr = 38.6 m$^3$ | 3.2 m × 10 m Horizontal | Inc. Below | 30.5 Dry 77.5 Op. |

TABLE 2-continued

Size and weight requirements of prior art process train.

| Equipment Item | Technology & Performance | Residence Requirements | Size (ID × T/T) | Plot Area (m²) | Weights (Tonnes) |
|---|---|---|---|---|---|
| Electrostatic Treater | Existing Electrostatic Technology Desalter + 100 m³/hr Wash Water Outlet: 0.5% BS&W 285 mg/l Salt | As Required for Spec | 4.2 m × 16 m Horizontal | 90 | 82.2 Dry<br><br>288.2 Op. |
| Total | — | — | — | 275 | 353.4 Dry<br>1047.4 Op. |

Figure 2:
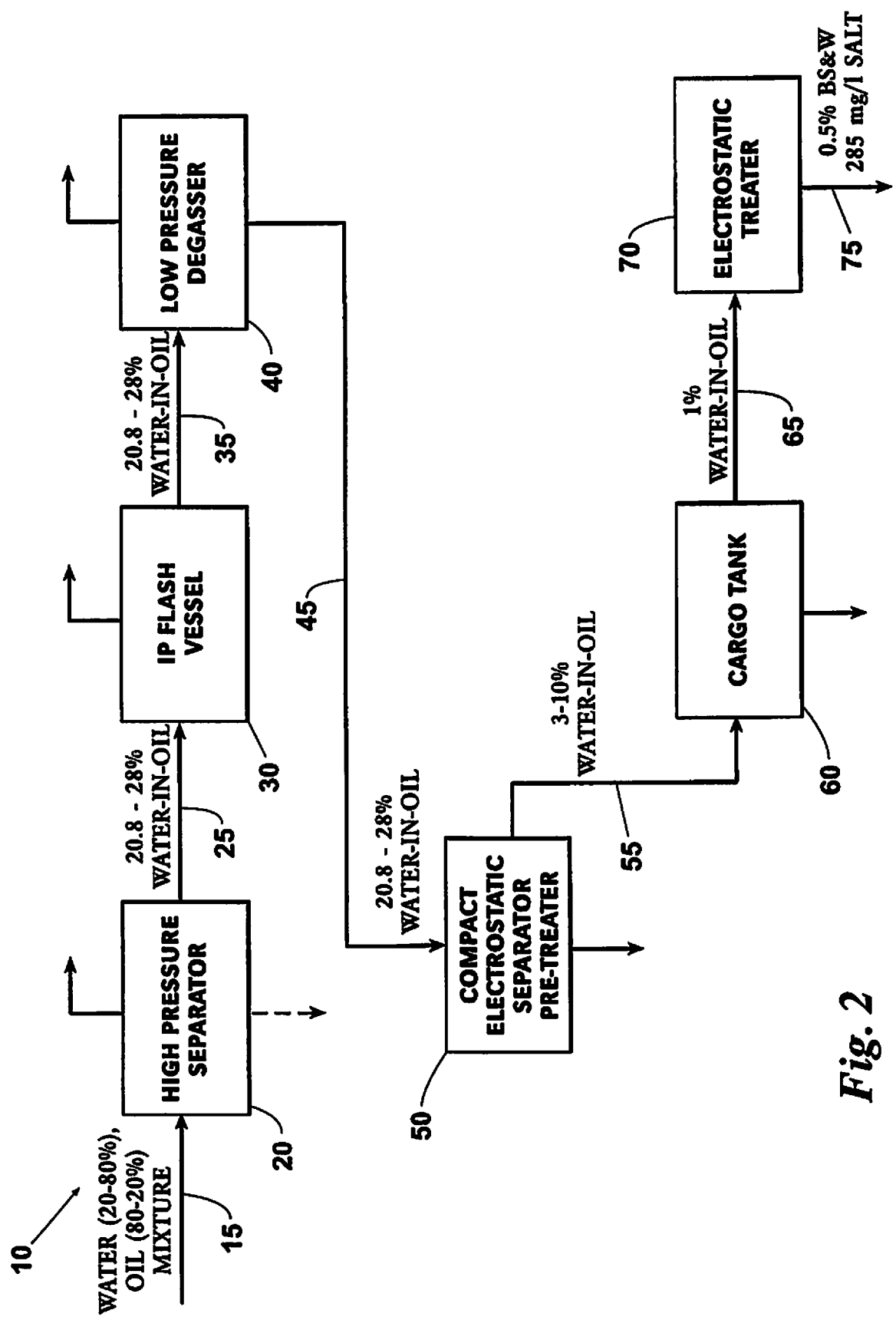
FIG. 2 is a block flow diagram of a preferred embodiment of a topside process train that practices the system and method of this invention, showing the high pressure separator, the intermediate flash vessel, the low pressure degasser, the compact electrostatic separator pre-treater, the crude oil storage tank, and the electrostatic treater in the process train.

Referring now to FIG. 2, a preferred embodiment of a topside process train 10 includes a high pressure separator 20, an intermediate pressure flash vessel 30 arranged downstream of the high pressure separator 20, a low pressure degasser 40 arranged downstream of the intermediate pressure flash vessel 30, a compact electrostatic separator pre-treater 50 arranged downstream of the low pressure degasser 40, a crude oil storage tank ("cargo tank") 60 arranged downstream of the compact electrostatic separator pre-treater 50, and, finally, an electrostatic treater 70 arranged downstream of the cargo tank 60.

Compared to the prior art train of FIG. 1, the process train of FIG. 2, excluding the cargo tank, has a plot area of 177 m², thereby reducing space requirements by 103 m² (a 37% reduction), and a dry weight of 178.8 tonnes, thereby reducing the total dry weight by 176.2 tonnes (a 50% reduction, with operating weight reduced by 513.3 tonnes or 49%).

TABLE 3

Preferred embodiment of the process train.

| Equipment Item | Technology & Performance | Residence Rqmts. | Size (ID × T/T) | Plot Area (m²) | Plot Area Reduction | Weights (Tonnes) | Weight Reduction |
|---|---|---|---|---|---|---|---|
| HP Separator | Existing 2/3-Phase Separator Inlet: 20-80% Water, 80-20% Oil Outlet: 25% Water-in-Oil | 2 Phase: 2 Mins Liquids @ 1255 m³/hr = 41.83 m³ 3 Phase: 5 minutes Oil @ 1061 m³/hr = 88.4 m³ 5 minutes Water @ 794 m³/hr = 66.2 m³ 20 m³ Surge both 2 & 3 phase | 4.4 m × 16 m Horizontal | ≈95 | n/a | 117.5 Dry 302.5 Op. | n/a Dry n/a Op. |
| IP Flash Vessel | CONSEPT Compact Design Inlet: 20.8-28% Water-in-Oil | Cyclonic degassing with no slug volume rqmt. | 1.6 m × 5.3 m Vertical | ≈6 | ≈+6 | 1.4 Dry 3.4 Op. | −38.0 Dry −89.0 Op. |
| LP Degasser | CONSEPT Compact Design Inlet: 20.8-28% Water-in-Oil | Cyclonic degassing with no slug volume rqmt. | 1.6 m × 5.3 m Vertical | ≈6 | ≈+6 | 1.4 Dry 3.4 Op. | −29.1 Dry −73.1 Op. |
| Pre-Treater | Cameron Compact Electrostatic Separator (C.E.S.) Technology Inlet: 20.8-28% Water-in-Oil Outlet: 3-10% Water-in-Oil | As required for spec. | 4.2 m × 3.3 m Vertical | ≈25 | ≈−70 | 24.0 Dry 100.5 Op. | −59.8 Dry −186.3 Op. |

TABLE 3-continued

Preferred embodiment of the process train.

| Equipment Item | Technology & Performance | Residence Rqmts. | Size (ID × T/T) | Plot Area (m²) | Plot Area Reduction | Weights (Tonnes) | Weight Reduction |
|---|---|---|---|---|---|---|---|
| Cargo Tank | Inlet: 3-10% Water-in-Oil Outlet: 1% Water-in-Oil | Exisiting | Existing | Existing | n/a | n/a | n/a |
| Electrostatic Treater | Hi-Flux Dual Frequency Electrostatic Desalter + 100 m³/hr Wash Water Outlet: 0.5% BS&W 285 mg/l Salt | As required for spec. | 4.2 m × 6.1 m Horizontal | ≈45 | ≈−45 | 34.5 Dry 123.3 Op. | −49.3 Dry −164.9 Op. |
| Total | — | — | — | 177 | ≈−103 | 178.8 Dry 533.1 Op. | −176.2 Dry −513.3 Op. |

Referring to FIG. 2, the high pressure separator 20 for this embodiment has the same characteristics, requirements, and performance as the high pressure separator in the prior art process train shown in FIG. 1. The high pressure separator 20 receives a mixed process stream 15 that may contain from 20 to 80% water and from 80 to 20% oil.

The outlet stream 25 from the high pressure separator 20 is routed to the intermediate pressure flash vessel 30, which may have a CONSEPT® inlet cyclonic distributor (Cameron Solutions, Inc., Houston, Tex.) and demisting cyclones. Using the CONSEPT® inlet cyclonic distributor, which has a liquid hold-up time of only thirty seconds, allows the intermediate pressure flash vessel 30 to be vertically situated within the process train 10, with significant reductions in the space and weight of the process train 10.

The outlet stream 35 from the intermediate pressure flash vessel 30 is then routed to the low pressure degasser 40, which may also have an CONSEPT® inlet cyclonic distributor and demisting cyclones. Using the CONSEPT® inlet cyclonic distributor allows the low pressure degasser 40 to be vertically situated within the process train 10, with significant reductions in the space and weight of the process train 10.

The outlet stream 45 from the low pressure degasser 40 is routed to the compact electrostatic separator pre-treater 50. The pre-treater 50 includes at least two elongated separator vessels oriented at an incline and connected to one another so that an upwardly flowing oil-predominant fluid passes from the first separator vessel to the second separator vessel where further electrostatic separation of water from the oil-predominant fluid occurs. Each vessel has an electrode at its upper end preferably connected to a different voltage source. The inlet to each vessel is located relative to the electrode to provide an up flow or a down flow vessel. Additionally, the first vessel may be at a different elevation than the second vessel. An additional vessel may be included with output from the first vessel bypassing the additional vessel, the second vessel, or both. Baffles may be added in the water collection portion of each vessel to reduce turbulence and settling distances. The compact electrostatic separator pre-treater 50 is further described in U.S. Pat. No. 9,095,790 B2, the contents of which are incorporated herein by reference.

The compact electrostatic separator pre-treater 50 may take an inlet water cut of 20.8 to 28% water-in-oil and reduce it to between 3 to 10% water-in-oil. This pre-treater 50 is also a vertical unit, which further reduces the space and weight of the process train 10 compared to the prior art process train in FIG. 1.

The outlet stream 55 from the compact electrostatic separator pre-treater 50 is routed to the cargo tank 60, where it is de-watered from 3 to 10% water-in-oil to 1% water-in-oil. The cargo tank 60 may be any size and type that are well known in the art.

The outlet stream 65 from the cargo tank 60 is routed to the electrostatic treater 70. The electrostatic treater employs DUAL FREQUENCY® technology (Cameron Solutions, Inc., Houston, Tex.) as described in U.S. Pat. No. 6,860,979 B2 and U.S. Pat. No. 7,351,320 B2, the contents of which are herein incorporated by reference. This technology includes passing the oil-water emulsion into a treatment vessel, establishing at least one dual frequency electric field within the vessel, and selectably varying the electric field at a first frequency modulated in intensity at a second frequency where the first frequency is greater than the second. Preferably, the BS&W content of the stream 75 exiting the electrostatic treater 70 is no greater than 0.5% BS&W and 285 mg/l salt.

Figure 3:
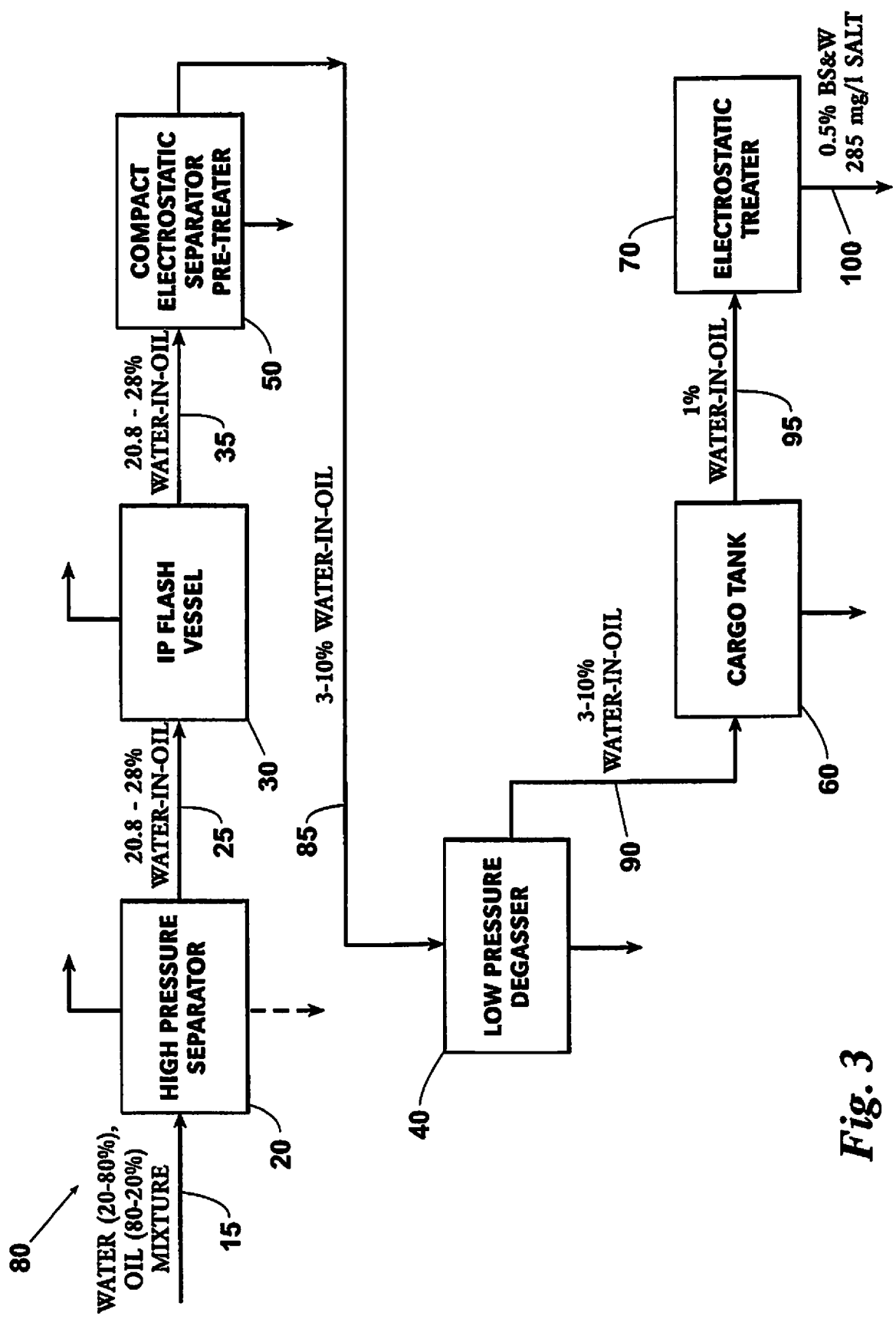
FIG. 3 is a block flow diagram of a preferred embodiment of a topside process train that practices the system and method of this invention, showing the high pressure separator, the intermediate pressure flash vessel, the compact electrostatic separator pre-treater, the low pressure degasser, the crude oil storage tank, and the electrostatic treater in the process train.

Referring now to FIG. 3, another preferred embodiment of a topside process train 80 includes a high pressure separator 20 that receives a mixed stream 15 containing 20 to 80% water and 80 to 20% oil, an intermediate pressure flash vessel 30 arranged downstream of the high pressure separator 20 that receives the outlet stream 25 from the high pressure separator 20, a compact electrostatic separator pre-treater 50 arranged downstream of the intermediate pressure flash vessel 30 that receives the outlet stream 35 from the intermediate pressure flash vessel 30, a low pressure degasser 40 arranged downstream of the compact electrostatic separator pre-treater 50 that receives the outlet stream 85 from the pre-treater 50, a crude oil storage tank ("cargo tank") 60 arranged downstream of the low pressure degasser 40 that receives the outlet stream 90 from the low pressure degasser 40, and, finally, an electrostatic treater 70 arranged downstream of the cargo tank 60 that receives the outlet stream 95 from the cargo tank 60.

The equipment for each component of the process train in FIG. 3 is the same as the equipment for the process train described in FIG. 2 and Table 3, with the same advantages in reduced space and weight, and the size of the low pressure degasser 40 is not affected by the relative position of the compact electrostatic separator pre-treater 50. Preferably, the BS&W content of the stream 100 as it exits the process train 80 is no greater than 0.5% BS&W and 285 mg/l salt.

Figure 4:
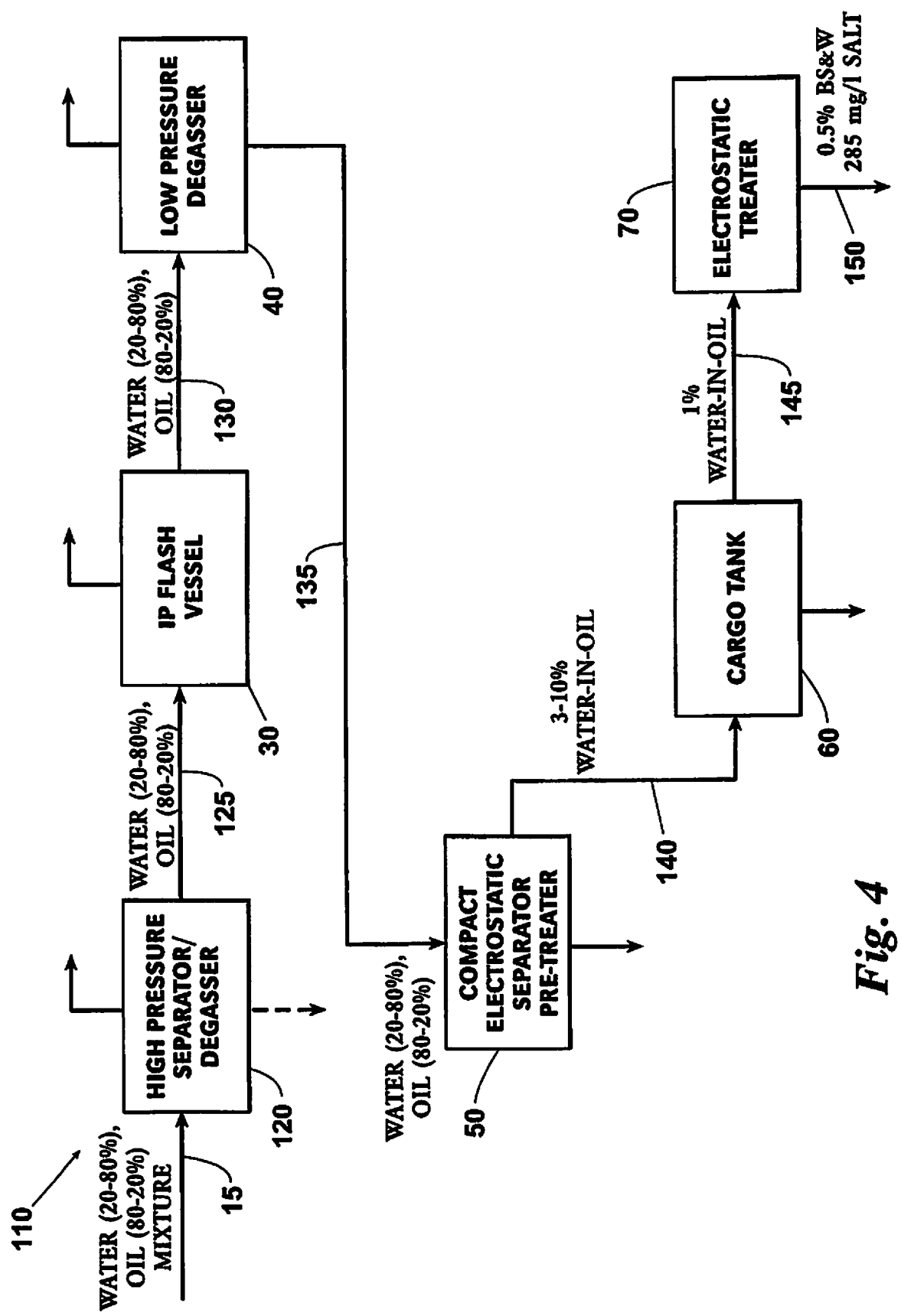
FIG. 4 is a block flow diagram of a preferred embodiment of a topside process train that practices the system and method of this invention, showing the high pressure separator/degasser, the intermediate pressure flash vessel, the low pressure degasser, the compact electrostatic separator pre-treater, the crude oil storage tank, and the electrostatic treater in the process train.

Referring now to FIG. 4, a preferred embodiment of a topside process train 110 includes a high pressure separator/degasser 120, an intermediate pressure flash vessel 30 arranged downstream of the high pressure separator/degasser 120, a low pressure degasser 40 arranged downstream of the intermediate pressure flash vessel 30, a compact electrostatic separator pre-treater 50 arranged downstream of the low pressure degasser 40, a crude oil storage tank ("cargo tank") 60 arranged downstream of the compact electrostatic separator pre-treater 50, and, finally, an electrostatic treater 70 arranged downstream of the cargo tank 60.

Compared to the prior art train of FIG. 1, the process train of FIG. 4, excluding the cargo tank, has a plot area of 137 $m^2$, thereby reducing space requirements by 138 $m^2$ (a 50% reduction), and a dry weight of 101.3 tonnes, thereby reducing the total dry weight by 253.7 tonnes (a 72% reduction, with operating weight reduced by 765.8 tonnes or 73%).

TABLE 4

Preferred embodiment of the process train.

| Equipment Item | Technology & Performance | Residence Rqmts. | Size (ID × T/T) | Plot Area ($m^2$) | Plot Area Reduction | Weights (Tonnes) | Weight Reduction |
| --- | --- | --- | --- | --- | --- | --- | --- |
| HP Separator/ Degasser | CONSEPT Compact Design Inlet: 20-80% Water, 80-20% Oil | 30 seconds liquid retention with cyclonic degassing | 3.2 m × 11.2 m Horizontal | ≈55 | ≈−40 | 40.0 Dry 50.0 Op. | −77.5 Dry −252.5 Op. |
| IP Flash Vessel | CONSEPT Compact Design Inlet: 20-80% Water, 80-20% Oil | Cyclonic degassing with no slug volume rqmt. | 1.6 m × 5.3 m Vertical | ≈6 | ≈+6 | 1.4 Dry 3.4 Op. | −38.0 Dry −89.0 Op. |
| LP Degasser | CONSEPT Compact Design Inlet: 20-80% Water, 80-20% Oil | Cyclonic degassing with no slug volume rqmt. | 1.6 m × 5.3 m Vertical | ≈6 | ≈+6 | 1.4 Dry 3.4 Op. | −29.1 Dry −73.1 Op. |
| Pre-Treater | Cameron Compact Electrostatic Separator (C.E.S.) Technology Inlet: 20-80% Water, 80-20% Oil Outlet: 3-10% Water-in-Oil | As required for spec. | 4.2 m × 3.3 m Vertical | ≈25 | ≈−65 | 24.0 Dry 100.5 Op. | −59.8 Dry −186.3 Op. |
| Cargo Tank | Inlet: 3-10% Water-in-Oil Outlet: 1% Water-in-Oil | Existing | Existing | Existing | n/a | n/a | n/a |
| Electrostatic Treater | Hi-Flux Dual Frequency Electrostatic Desalter + 100 $m^3$/hr Wash Water Outlet: 0.5% BS&W 285 mg/l Salt | As required for spec. | 4.2 m × 6.1 m Horizontal | ≈45 | ≈−45 | 34.5 Dry 123.3 Op. | −49.3 Dry −164.9 Op. |
| Total | — | — | — | 137 | ≈−138 | 101.3 Dry 280.6 Op. | −253.7 Dry −765.8 Op. |

Referring to FIG. 4, the high pressure separator/degasser 120 for this embodiment is in two-phase service and employs a CONSEPT® inlet cyclonic distributor (Cameron Solutions, Inc., Houston, Tex.) and demisting cyclones, which allows for the degassing of stream 15 in a compact vessel with only thirty seconds of liquid retention. Although the high pressure separator/degasser 120 remains in a horizontal position within the process train 110, both the size and weight of the high pressure separator/degasser 120 are reduced as shown in Table 4.

The outlet stream 125 from the high pressure separator/degasser 120 is routed to the intermediate pressure flash vessel 30, which may have a CONSEPT® inlet cyclonic distributor (Cameron Solutions, Inc., Houston, Tex.) and demisting cyclones. Using the CONSEPT® inlet cyclonic distributor, which has a liquid hold-up time of only thirty seconds, allows the intermediate pressure flash vessel 30 to be vertically situated within the process train 110, with significant reductions in the space and weight of the process train 110.

The outlet stream 130 from the intermediate pressure flash vessel 30 is then routed to the low pressure degasser 40, which may also have an CONSEPT® inlet cyclonic distributor and demisting cyclones. Using the CONSEPT® inlet cyclonic distributor allows the low pressure degasser 40 to be vertically situated within the process train 110, with significant reductions in the space and weight of the process train 110.

The outlet stream 135 from the low pressure degasser 40 is routed to the compact electrostatic separator pre-treater 50. The pre-treater 50 includes at least two elongated separator vessels oriented at an incline and connected to one another so that an upwardly flowing oil-predominant fluid passes from the first separator vessel to the second separator vessel where further electrostatic separation of water from the oil-predominant fluid occurs. Each vessel has an electrode at its upper end preferably connected to a different voltage source. The inlet to each vessel is located relative to the electrode to provide an up flow or a down flow vessel. Additionally, the first vessel may be at a different elevation than the second vessel. An additional vessel may be included with output from the first vessel bypassing the additional vessel, the second vessel, or both. Baffles may be added in the water collection portion of each vessel to reduce turbulence and settling distances. The compact electrostatic separator pre-treater 50 is further described in U.S. Pat. No. 9,095,790 B2, the contents of which are incorporated herein by reference.

The compact electrostatic separator pre-treater 50 may take an inlet water cut of 20 to 80% water-in-oil and reduce it to between 3 to 10% water-in-oil. This pre-treater 50 is also a vertical unit, which further reduces the space and weight of the process train 110 compared to the prior art process train in FIG. 1.

The outlet stream 140 from the compact electrostatic separator pre-treater 50 is routed to the cargo tank 60, where it is de-watered from 3 to 10% water-in-oil to 1% water-in-oil. The cargo tank 60 may be any size and type that are well known in the art.

The outlet stream 145 from the cargo tank 60 is routed to the electrostatic treater 70. The electrostatic treater 70 employs DUAL FREQUENCY® technology (Cameron Solutions, Inc., Houston, Tex.) as described in U.S. Pat. No. 6,860,979 B2 and U.S. Pat. No. 7,351,320 B2, the contents of which are herein incorporated by reference. This technology includes passing the oil-water emulsion into a treatment vessel, establishing at least one dual frequency electric field within the vessel, and selectably varying the electric field at a first frequency modulated in intensity at a second frequency where the first frequency is greater than the second. Preferably, the BS&W content of the stream 150 as it exits the electrostatic treater 70 is no greater than 0.5% BS&W and 285 mg/l salt.

Figure 5:
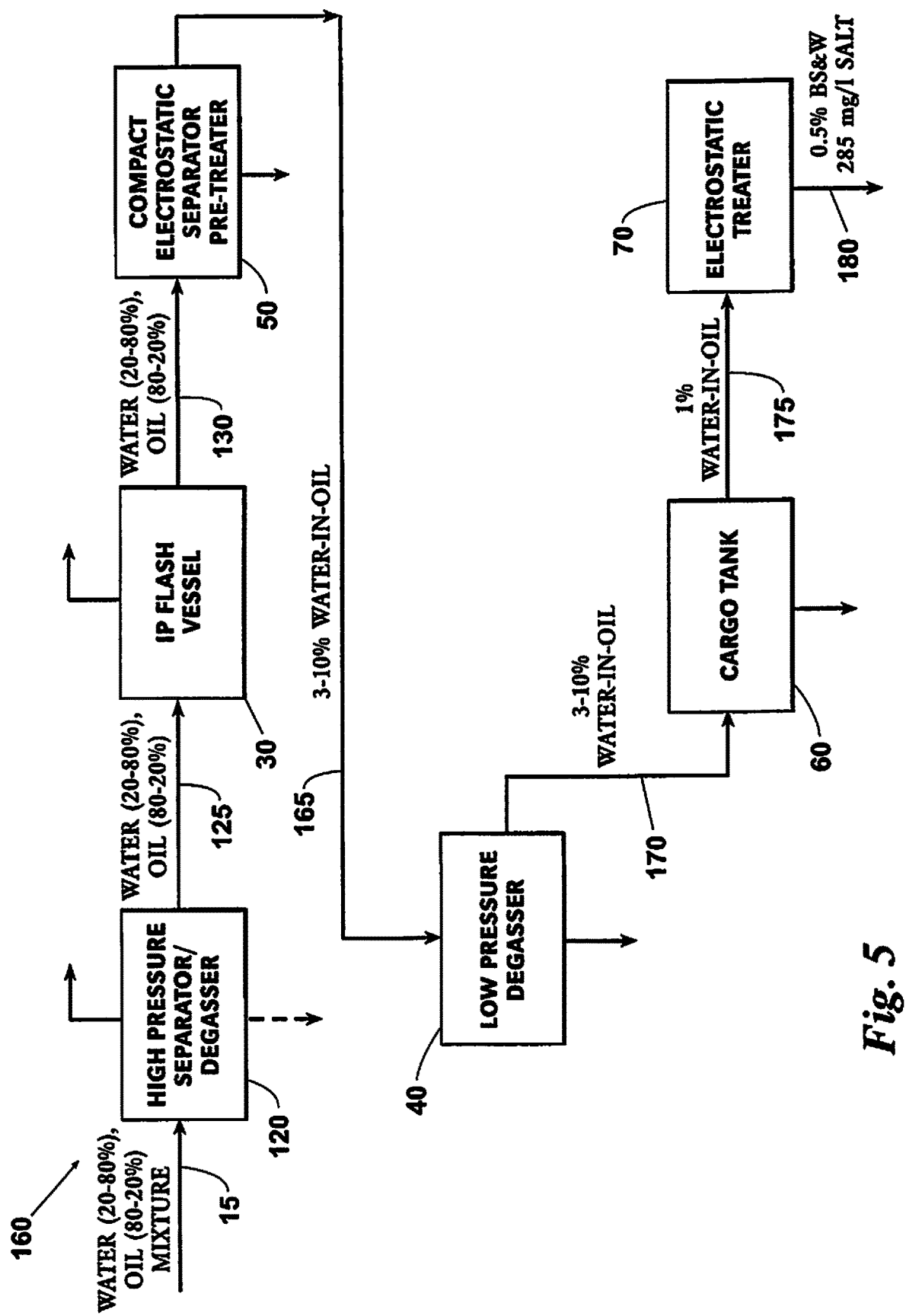
FIG. 5 is a block flow diagram of a preferred embodiment of a topside process train that practices the system and method of this invention, showing the high pressure separator/degasser, the intermediate pressure flash vessel, the compact electrostatic separator pre-treater, the low pressure degasser, the crude oil storage tank, and the electrostatic treater in the process train.

Referring now to FIG. 5, another preferred embodiment of a topside process train 160 includes a high pressure separator/degasser 120 that receives a mixed stream 15 containing 20 to 80% water and 80 to 20% oil, an intermediate pressure flash vessel 30 arranged downstream of the high pressure separator/degasser 120 that receives the outlet stream 125 from the high pressure separator/degasser 120, a compact electrostatic separator pre-treater 50 arranged downstream of the intermediate pressure flash vessel 30 that receives the outlet stream 130 from the intermediate pressure flash vessel 30, a low pressure degasser 40 arranged downstream of the compact electrostatic separator pre-treater 50 that receives the outlet stream 165 from the pre-treater 50, a crude oil storage tank ("cargo tank") 60 arranged downstream of the low pressure degasser 40 that receives the outlet stream 170 from the low pressure degasser 40, and, finally, an electrostatic treater 70 arranged downstream of the cargo tank 60 that receives the outlet stream 175 from the cargo tank 60.

The equipment for each component of the process train in FIG. 5 is the same as the equipment for the process train described in FIG. 4 and Table 4, with the same advantages in reduced space and weight, and the size of the low pressure degasser 40 is not affected by the relative position of the compact electrostatic separator pre-treater 50. Preferably, the BS&W content of the stream 180 as it exits the process train 160 is no greater than 0.5% BS&W and 285 mg/l salt.

Figure 6:
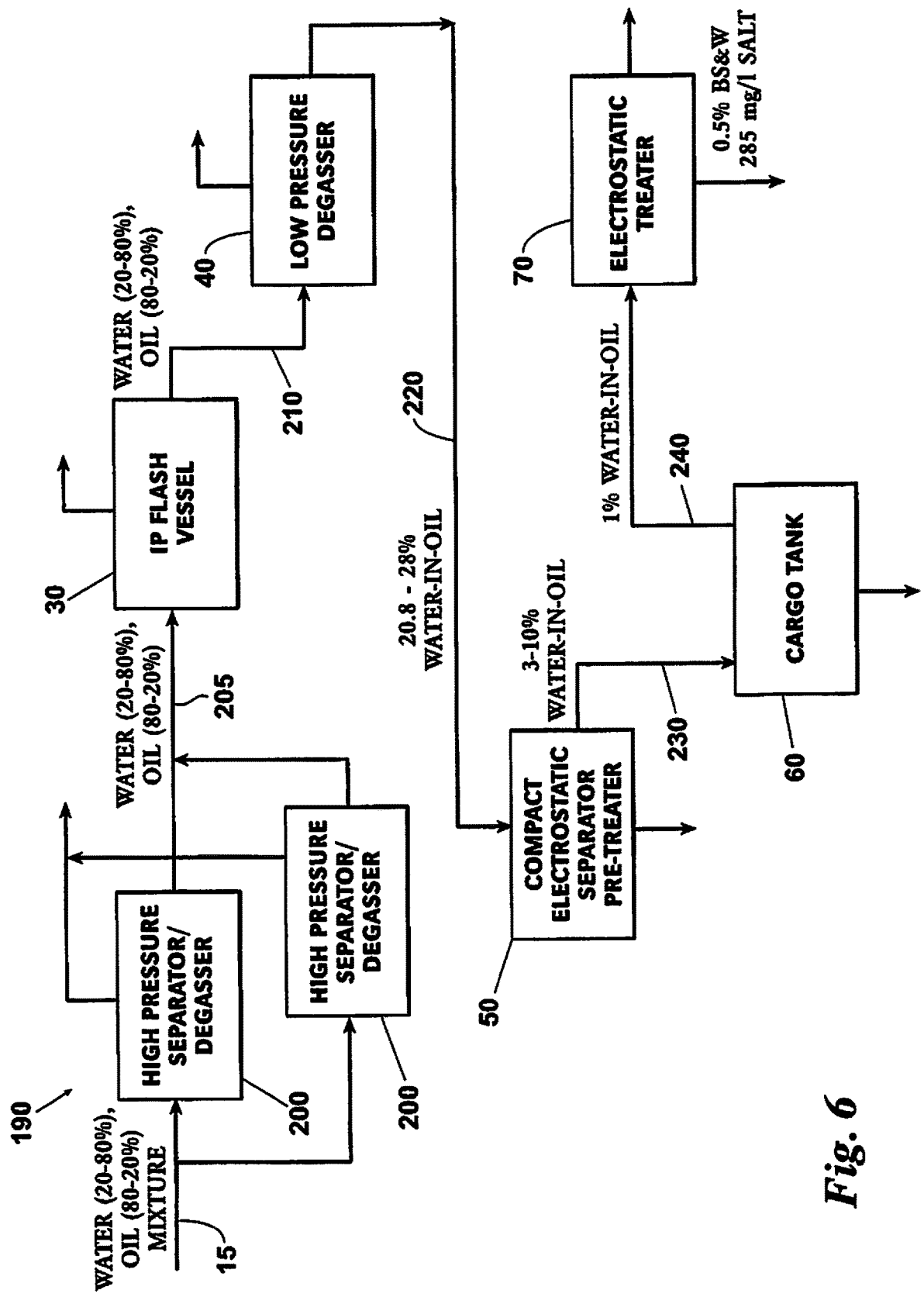
FIG. 6 is a block flow diagram of a preferred embodiment of a topside process train that practices the system and method of this invention, showing two high pressure separator/degassers in parallel, the intermediate pressure flash vessel, the low pressure degasser, the compact electrostatic separator pre-treater, the crude oil storage tank, and the electrostatic treater in the process train.

Referring now to FIG. 6, a preferred embodiment of a topside process train 190 includes two high pressure separators/degassers 200, an intermediate pressure flash vessel 30 arranged downstream of the high pressure separators/degassers 200, a low pressure degasser 40 arranged downstream of the intermediate pressure flash vessel 30, a compact electrostatic separator pre-treater 50 arranged downstream of the low pressure degasser 40, a crude oil storage tank ("cargo tank") 60 arranged downstream of the compact electrostatic separator pre-treater 50, and, finally, an electrostatic treater 70 arranged downstream of the cargo tank 60.

Compared to the prior art train of FIG. 1, the process train of FIG. 6, excluding the cargo tank, has a plot area of 102 m$^2$, thereby reducing space requirements by 173 m$^2$ (a 63% reduction), and a dry weight of 107.3 tonnes, thereby reducing the total dry weight by 247.7 tonnes (a 70% reduction, with operating weight reduced by 759.8 tonnes or 73%).

TABLE 5

Preferred embodiment of the process train.

| Equipment Item | Technology & Performance | Residence Rqmts. | Size (ID × T/T) | Plot Area (m²) | Plot Area Reduction | Weights (Tonnes) | Weight Reduction |
|---|---|---|---|---|---|---|---|
| HP Separator/ Degasser Two (2) × 50% | CONSEPT Compact Design Inlet: 20-80% Water, 80-20% Oil | 30 seconds liquid retention with cyclonic degassing | Two (2) 2.5 m × 10.0 m Vertical | ≈20 | ≈−75 | 46.0 Dry 56.0 Op. | −71.5 Dry −246.5 Op. |
| IP Flash Vessel | CONSEPT Compact Design Inlet: 20-80% Water, 80-20% Oil | Cyclonic degassing with no slug volume rqmt. | 1.6 m × 5.3 m Vertical | ≈6 | ≈+6 | 1.4 Dry 3.4 Op. | −38.0 Dry −89.0 Op. |
| LP Degasser | CONSEPT Compact Design Inlet: 20-80% Water, 80-20% Oil | Cyclonic degassing with no slug volume rqmt. | 1.6 m × 5.3 m Vertical | ≈6 | ≈+6 | 1.4 Dry 3.4 Op. | −29.1 Dry −73.1 Op. |
| Pre-Treater | Cameron Compact Electrostatic Separator (C.E.S.) Technology Inlet: 20.8-28% Water-in-Oil Outlet: 3-10% Water-in-Oil | As required for spec. | 4.2 m × 3.3 m Vertical | ≈25 | ≈−65 | 24.0 Dry 100.5 Op. | −59.8 Dry −186.3 Op. |
| Cargo Tank | Inlet: 3-10% Water-in-Oil Outlet: 1% Water-in-Oil | Existing | Existing | Existing | n/a | n/a | n/a |
| Electrostatic Treater | Hi-Flux Dual Frequency Electrostatic Desalter + 100 m³/hr Wash Water Outlet: 0.5% BS&W 285 mg/l Salt | As required for spec. | 4.2 m × 6.1 m Horizontal | ≈45 | ≈−45 | 34.5 Dry 123.3 Op. | −49.3 Dry −164.9 Op. |
| Total | — | — | — | 102 | ≈−173 | 107.3 Dry 286.6 Op. | −247.7 Dry −759.8 Op. |

Referring to FIG. 6, the two high pressure separator/degassers 200 for this embodiment operate in parallel, with each separator/degasser 200 receiving approximately fifty percent of the stream 15. Each high pressure separator/degasser 200 is in two-phase service and employs a CONSEPT® inlet cyclonic distributor (Cameron Solutions, Inc., Houston, Tex.) and demisting cyclones, which allows for the degassing of the stream 15 in a compact vessel with only thirty seconds of liquid retention. Dividing the stream between the two separator/degassers 200 allows the separator/degassers 200 to be mounted vertically rather than horizontally, thereby reducing the space requirements and weight of the process train 190 as shown in Table 5.

The outlet streams 205 from the high pressure separator/degassers 200 are combined and routed to the intermediate pressure flash vessel 30, which may have a CONSEPT® inlet cyclonic distributor (Cameron Solutions, Inc., Houston, Tex.) and demisting cyclones. Using the CONSEPT® inlet cyclonic distributor, which has a liquid hold-up time of only thirty seconds, allows the intermediate pressure flash vessel 30 to be vertically situated within the process train 190, with significant reductions in the space and weight of the process train 190.

The outlet stream 210 from the intermediate pressure flash vessel 30 is then routed to the low pressure degasser 40, which may also have an CONSEPT® inlet cyclonic distributor and demisting cyclones. Using the CONSEPT® inlet cyclonic distributor allows the low pressure degasser 40 to be vertically situated within the process train 190, with significant reductions in the space and weight of the process train 190.

The outlet stream 220 from the low pressure degasser 40 is routed to the compact electrostatic separator pre-treater 50. The pre-treater 50 includes at least two elongated separator vessels oriented at an incline and connected to one another so that an upwardly flowing oil-predominant fluid passes from the first separator vessel to the second separator vessel where further electrostatic separation of water from the oil-predominant fluid occurs. Each vessel has an electrode at its upper end preferably connected to a different voltage source. The inlet to each vessel is located relative to the electrode to provide an up flow or a down flow vessel. Additionally, the first vessel may be at a different elevation than the second vessel. An additional vessel may be included with output from the first vessel bypassing the additional vessel, the second vessel, or both. Baffles may be added in the water collection portion of each vessel to reduce turbulence and settling distances. The compact electrostatic separator pre-treater 50 is further described in U.S. Pat. No. 9,095,790 B2, the contents of which are incorporated herein by reference.

The compact electrostatic separator pre-treater 50 may take an inlet water cut of 20.8 to 28% water-in-oil and reduce it to between 3 to 10% water-in-oil. This pre-treater 50 is also a vertical unit, which further reduces the space and weight of the process train 190 compared to the prior art process train in FIG. 1.

The outlet stream 230 from the compact electrostatic separator pre-treater 50 is routed to the cargo tank 60, where it is de-watered from 3 to 10% water-in-oil to 1% water-in-oil. The cargo tank 60 may be any size and type that are well known in the art. The outlet stream 240 from the cargo tank 60 is routed to the electrostatic treater 70. The electrostatic treater employs DUAL FREQUENCY® technology (Cameron Solutions, Inc., Houston, Tex.) as described in U.S. Pat. No. 6,860,979 B2 and U.S. Pat. No. 7,351,320 B2, the contents of which are herein incorporated by reference. This technology includes passing the oil-water emulsion into a treatment vessel, establishing at least one dual frequency electric field within the vessel, and selectably varying the electric field at a first frequency modulated in intensity at a second frequency where the first frequency is greater than the second. Preferably, the BS&W content of the stream 250 as it exits the electrostatic treater 70 is no greater than 0.5% BS&W and 285 mg/l salt.

Figure 7:
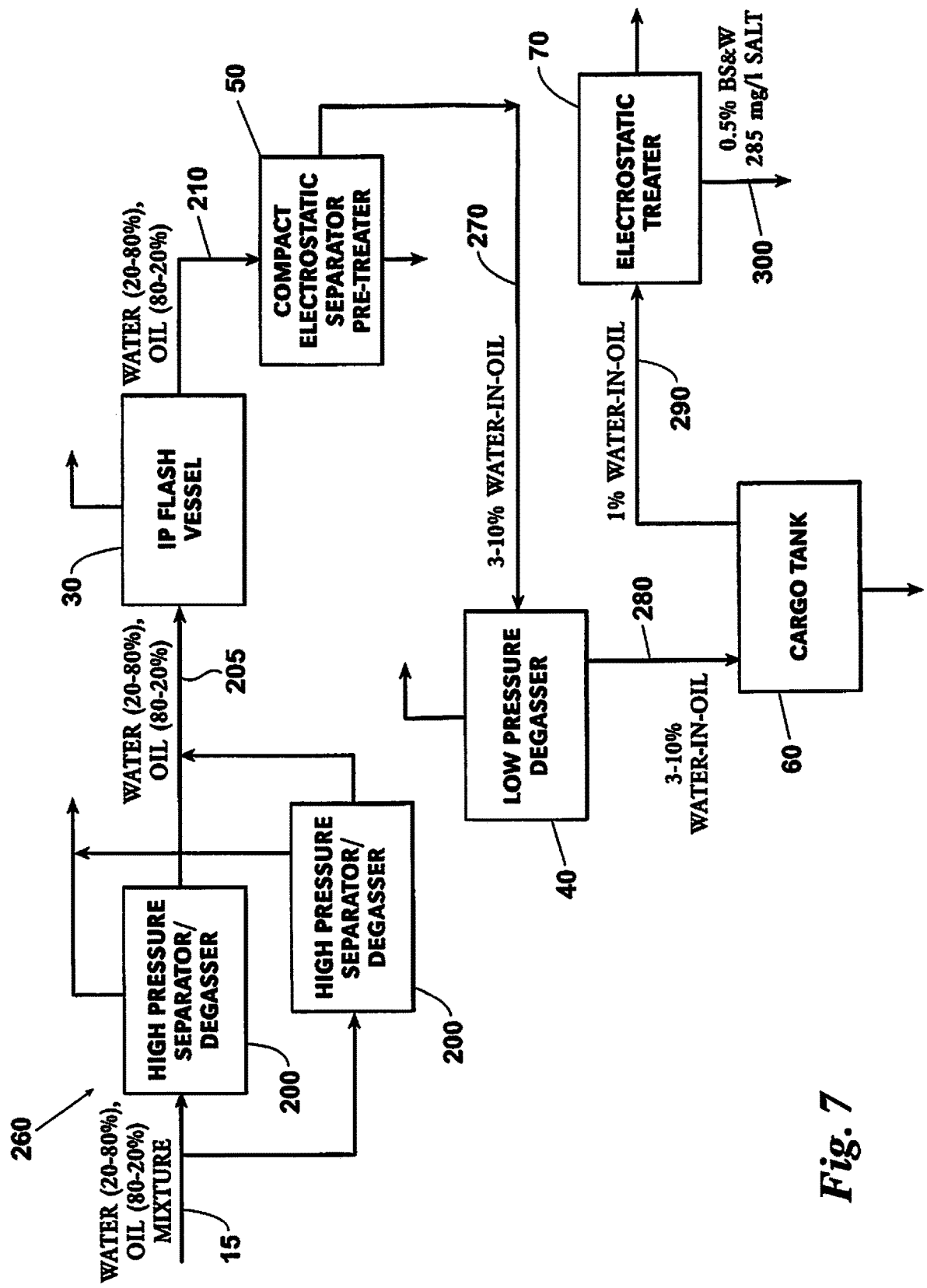
FIG. 7 is a block flow diagram of a preferred embodiment of a topside process train that practices the system and method of this invention, showing two high pressure separator/degassers in parallel, the intermediate pressure flash vessel, the compact electrostatic separator pre-treater, the low pressure degasser, the crude oil storage tank, and the electrostatic treater in the process train.

Referring now to FIG. 7, another preferred embodiment of a topside process train 260 includes two high pressure separator/degassers 200 operating in parallel, with each separator/degasser 200 receiving approximately half of a mixed stream 15 containing 20 to 80% water and 80 to 20% oil, an intermediate pressure flash vessel 30 arranged downstream of the high pressure separator/degassers 200 that receives the combined outlet stream from the separator/degassers 200, a compact electrostatic separator pre-treater 50 arranged downstream of the intermediate pressure flash vessel 30 that receives the outlet stream 210 from the intermediate pressure flash vessel 30, a low pressure degasser 40 arranged downstream of the compact electrostatic separator pre-treater 50 that receives the outlet stream 270 from the pre-treater 50, a crude oil storage tank ("cargo tank") 60 arranged downstream of the low pressure degasser 40 that receives the outlet stream 280 from the low pressure degasser 40, and, finally, an electrostatic treater 70 arranged downstream of the cargo tank 60 that receives the outlet stream 290 from the cargo tank 60.

The equipment for each component of the process train in FIG. 7 is the same as the equipment for the process train described in FIG. 6 and Table 5, with the same advantages in reduced size and weight. Preferably, the BS&W content of the stream 300 as it exits the process train 260 is no greater than 0.5% BS&W and 285 mg/l salt.

While the invention has been described with a certain degree of particularity, many changes may be made in the details of construction, the arrangement of components, the steps of the process, and the order of the steps without departing from the spirit and scope of this disclosure. Further, multiple systems may be operated in parallel. The invention is not limited to the embodiments set forth herein for purposes of exemplification, but is limited only by the scope of the attached claims, including the full range of equivalency to which each element thereof is entitled.

What is claimed is:

1. A system for dehydrating crude oil, the system comprising:
   a means for reducing a gas content of a produced stream containing oil and water;
   a treatment block configured to receive the reduced gas content stream, the treatment block including a degasser and an electrostatic separator; and
   a cargo tank configured to receive an outlet stream of the treatment block; and
   an electrostatic treater configured to receive an outlet stream of the cargo tank.

2. A system according to claim 1, further comprising the electrostatic separator configured to receive an outlet stream of the degasser.

3. A system according to claim 1, further comprising the degasser configured to receive an outlet stream of the electrostatic separator.

4. A system according to claim 1, the electrostatic separator including at least two elongated vessels that are oriented at an incline and in fluid communication with one another.

5. A system for dehydrating crude oil, the system comprising:
   means for reducing a gas content of a produced stream containing oil and water;
   a treatment block configured to receive the reduced gas content stream, the treatment block including a degasser and an electrostatic separator;
   a storage tank configured to receive an outlet stream of the treatment block; and
   an electrostatic treater configured to receive an outlet stream of the storage tank.

6. A system according to claim 5, further comprising the electrostatic separator configured to receive an outlet stream of the degasser.

7. A system according to claim 5, further comprising the degasser configured to receive an outlet stream of the electrostatic separator.

8. A system according to claim 5, the electrostatic separator including at least two elongated vessels that are oriented at an incline and in fluid communication with one another.

9. A system for dehydrating crude oil, the system comprising:
   a flash vessel;
   a treatment block coupled to the flash vessel, the treatment block including a degasser and an electrostatic separator;
   a tank coupled to the treatment block; and
   an electrostatic treater coupled to the tank.

10. The system of claim 9, further comprising a high-pressure separator coupled to the flash vessel.

11. The system of claim 9, wherein the electrostatic separator is configured to receive an outlet stream of the degasser.

12. The system of claim 9, wherein the electrostatic separator includes at least two elongated vessels that are oriented at an incline and in fluid communication with one another.

13. The system of claim 9, wherein the electrostatic separator is a compact electrostatic separator.

14. The system of claim 9, wherein the degasser includes a cyclonic distributor and one or more demisting cyclones.

15. The system of claim 9, further comprising a cyclonic distributor and one or more demisting cyclones coupled to the flash vessel.

16. The system of claim 9, wherein the electrostatic separator is a vertically oriented unit.

17. The system of claim 9, wherein the electrostatic separator is a vertically oriented compact electrostatic unit, and further comprising a high-pressure separator coupled to the flash vessel and an electrostatic treater coupled to the tank.

* * * * *